United States Patent
Zafiroglu et al.

(10) Patent No.: US 7,005,395 B2
(45) Date of Patent: *Feb. 28, 2006

(54) STRETCHABLE COMPOSITE SHEETS AND PROCESSES FOR MAKING

(75) Inventors: Dimitri P. Zafiroglu, Wilmington, DE (US); Geoffrey David Hietpas, Newark, DE (US); Debora Flanagan Massouda, Wilmington, DE (US); Thomas Michael Ford, Greenville, DE (US)

(73) Assignee: Invista North America S.a.r.l., Wilmington, DE (US)

( * ) Notice: Subject to any disclaimer, the term of this patent is extended or adjusted under 35 U.S.C. 154(b) by 200 days.

This patent is subject to a terminal disclaimer.

(21) Appl. No.: 10/317,416

(22) Filed: Dec. 12, 2002

(65) Prior Publication Data

US 2004/0116024 A1 Jun. 17, 2004

(51) Int. Cl.
   *D04H 1/006* (2006.01)
   *B32B 5/026* (2006.01)
   *B32B 3/006* (2006.01)
(52) U.S. Cl. ............... 442/352; 442/401; 442/360; 442/362; 442/381; 442/382; 428/103; 156/85
(58) Field of Classification Search ............. 428/198, 428/373, 377, 371, 374, 103; 442/381, 352, 442/382, 409, 401, 361, 362, 360
See application file for complete search history.

(56) References Cited

U.S. PATENT DOCUMENTS

| | | | |
|---|---|---|---|
| 3,595,731 A | | 7/1971 | Davies et al. |
| 3,671,379 A | | 6/1972 | Evans et al. |
| 5,102,724 A | | 4/1992 | Okawahara et al. |
| 5,382,400 A | | 1/1995 | Pike et al. |
| 5,418,045 A | | 5/1995 | Pike et al. |
| 5,540,976 A | | 7/1996 | Shawver et al. |
| 5,804,021 A | | 9/1998 | Abuto et al. |
| 5,882,769 A | * | 3/1999 | McCormack et al. ........ 428/152 |
| 2003/0124938 A1 | * | 7/2003 | Zafiroglu et al. ............ 442/328 |
| 2003/0124939 A1 | * | 7/2003 | Zafiroglu et al. ............ 442/352 |
| 2003/0134094 A1 | * | 7/2003 | Zafiroglu et al. ............ 428/198 |
| 2004/0097154 A1 | * | 5/2004 | Bansal ........................ 442/345 |

* cited by examiner

Primary Examiner—Terrel Morris
Assistant Examiner—Lynda M. Salvatore
(74) Attorney, Agent, or Firm—Robert B. Furr, Jr.; Anne I. Breikss

(57) ABSTRACT

This invention relates to an improved method for preparing stretchable multiple-component bonded composite sheets which involves bonding a fibrous layer of spirally-crimpable multiple-component continuous filaments or staple fibers to one or more non-spirally-crimpable layers using an array of intermittent mechanical, chemical, or thermal bonds, and heating the bonded composite to activate the spiral crimp of the fibers in the spirally-crimpable layer. Multi-layer nonwoven fabrics prepared according to the method of the current invention have an improved combination of strength, aesthetics, stretch-recovery properties, and textile hand and drape compared to multiple-component nonwoven fabrics known in the art.

35 Claims, 4 Drawing Sheets

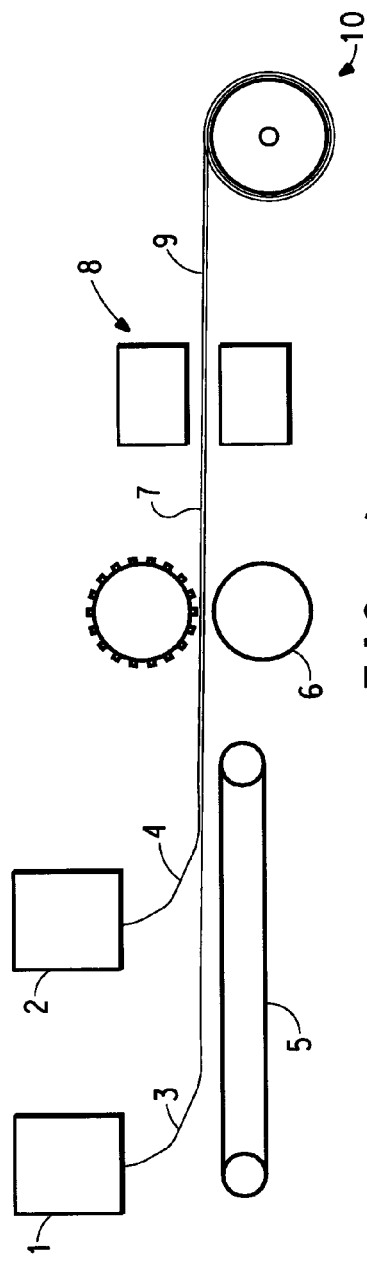
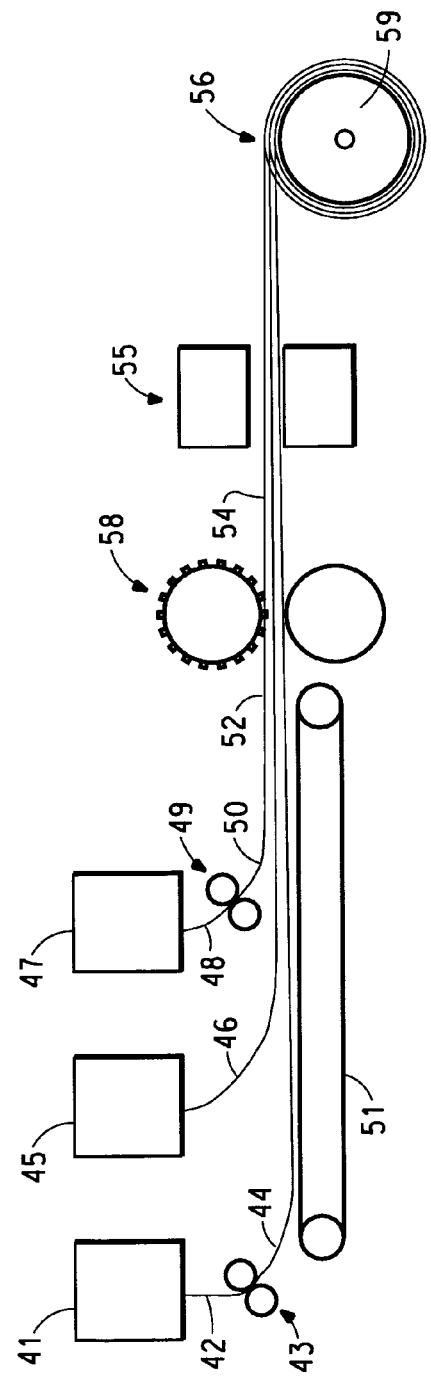

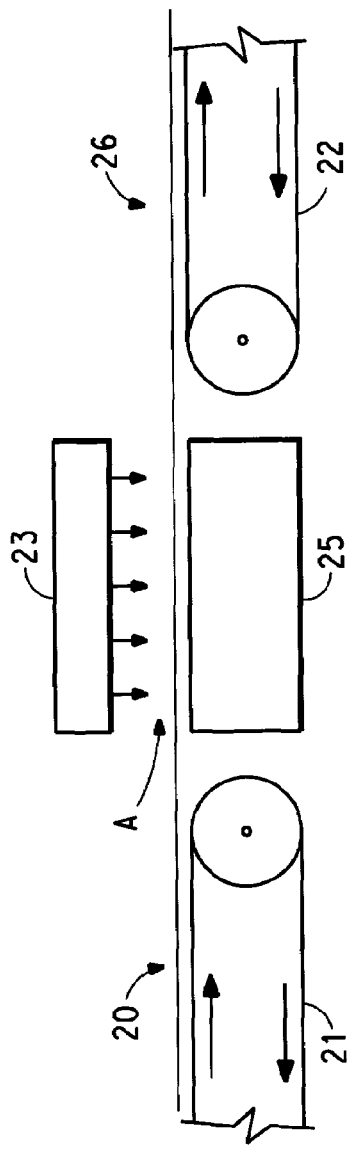
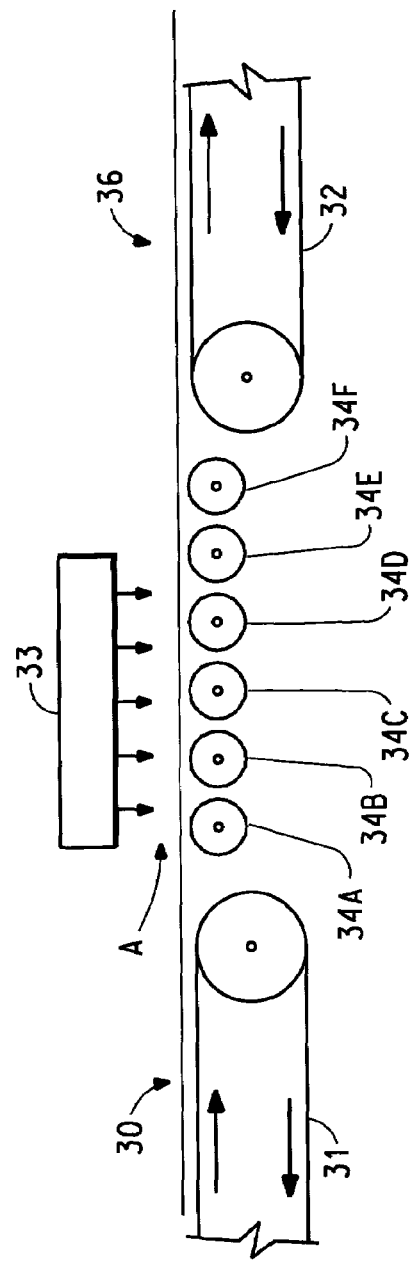

STRETCHABLE COMPOSITE SHEETS AND PROCESSES FOR MAKING

BACKGROUND OF THE INVENTION

1. Field of the Invention

This invention relates to an improved method for preparing stretchable multi-layer composite sheets wherein at least one layer in the multilayer composite sheet comprises multiple-component spirally-crimped fibers.

2. Description of the Related Art

Nonwoven webs made from multiple-component filaments are known in the art. The products are usually heavy, with high-loft, and the fibers are highly bonded at their cross-over points. For example, U.S. Pat. No. 3,595,731 to Davies et al. (Davies) describes bicomponent fibrous materials containing crimped fibers which are bonded mechanically by the interlocking of the spirals in the crimped fibers and adhesively by melting of a low-melting adhesive polymer component. The crimp can be developed and the potentially adhesive component activated in a single treatment step, or the crimp can be developed first followed by activation of the adhesive component to bond together fibers of the web which are in a contiguous relationship. The crimp is developed under conditions where no appreciable pressure is applied during the process that would prevent the fibers from crimping.

U.S. Pat. No. 5,102,724 to Okawahara et al. (Okawahara) describes the finishing of nonwoven fabrics comprising bicomponent polyester filaments produced by conjugate spinning of side-by-side filaments of polyethylene terephthalate copolymerized with a structural unit having a metal sulfonate group and a polyethylene terepthalate or a poly(1, 4-butylene terephthalate). The filaments are mechanically crimped prior to forming a nonwoven fabric. The fabric is rendered stretchable by exposure to infrared radiation while the filaments are in a relaxed state. During the infrared heating step, the conjugate filaments develop three dimensional crimp and high-loft.

U.S. Pat. No. 5,382,400 to Pike et al. (Pike) describes a process for making a nonwoven fabric which includes the steps of melt-spinning continuous multiple-component polymeric filaments, drawing the filaments, at least partially quenching the multiple-component filaments so that the filaments have latent helical (spiral) crimp, activating the latent helical crimp, and thereafter forming the crimped continuous multiple-component filaments into a nonwoven fabric. The resulting nonwoven fabric is described as being substantially stable and uniform and can have high loft.

PCT Published Application No. WO 00/66821 describes stretchable nonwoven webs which comprise a plurality of bicomponent fibers that can also be blended with non-bicomponent fibers which are point-bonded prior to heating to develop crimp in the filaments. The bicomponent filaments comprise a polyester component and another polymeric component that is preferably a polyolefin or polyamide. The heating step causes the bonded web to shrink resulting in a nonwoven fabric which exhibits elastic recovery in both the machine direction and the cross direction when stretched up to 30%.

Multi-layer composite elastic nonwoven materials are also known in the art. Examples of multi-layer elastic nonwoven materials include "stretch-bonded" and "neck-bonded" laminates. Stretch-bonded laminates are prepared by joining a gatherable layer to an elastic layer while the elastic layer is in an extended condition so that upon relaxing the layers, the gatherable layer is gathered. "Neck-bonded laminates" are produced by joining a necked, non-elastic layer with an elastic layer when the non-elastic layer is in an extended condition. The elastic layer generally comprises an elastic film or an elastic nonwoven web. Preparation of these composite nonwoven materials requires that one of the layers be in an extended condition prior to combining with the second layer. When elastic films are used as the elastic layer, the elastic composite materials are generally unsuitable for some apparel end uses due to the high retractive power of the elastic films.

U.S. Pat. No. 3,671,379 to Evans et al. (Evans) describes self-crimpable composite filaments which comprise a laterally eccentric assembly of at least two synthetic polyesters, the first of said two polyesters being partly crystalline in which the chemical repeat-units of its crystalline region are in a non-extended stable conformation and the second of said two polyesters being partly crystalline in which the chemical repeat-units of the crystalline region are in a conformation more closely approaching the length of the conformation of its fully extended chemical repeat-units. The composite filaments are capable of developing a high degree of helical crimp against the restraint imposed by high thread count woven structures, which crimp potential is unusually well retained despite application of elongating stress and high temperature. The composite filaments increase, rather than decrease, in crimp potential when annealed under tension as a part of the fiber production process. The filaments are described as being useful in knitted, woven, and nonwoven fabrics.

Stretchable nonwoven fabrics comprising spirally-crimped multiple-component fibers known in the art generally have poor hand due to the presence of the spirally-crimped fibers on the nonwoven fabric surface which contributes to surface harshness, pilling, etc. This is true even when the spirally-crimped fibers are blended with other textile fibers such as cotton, rayon, microfibers such as sub-denier polyester or nylon, polyethylene, polypropylene, etc. The desirable properties characteristic of these other textile fibers such as soft hand, absorbency, repellency, dye uniformity, etc. are diluted by blending with the spirally-crimped fibers. Nonwoven fabrics known in the art which contain spirally-crimped fibers blended with other fibers generally have limited use as home furnishing fabrics, apparel, etc. because of the relatively harsh surface created by the fully activated spirally-crimped fibers, and other blended surface properties described above.

There remains a need for low cost stretchable composite sheets such as multi-layer nonwoven fabrics which are strong, durable, and uniform and which have an improved combination of surface qualities, strength, uniformity, and drape for end uses such as apparel and home furnishings. It is further desirable to reduce the complexity of the manufacturing process by providing a process for preparing elastic composite sheets which does not require that one of the layers be in an extended state during the manufacturing process.

BRIEF SUMMARY OF THE INVENTION

This invention includes a stretchable multi-layer composite sheet comprising:

a first polymeric layer comprising at least 20 weight percent of spirally-crimped multiple-component fibers, the multiple-component fibers having a cross-section and a length, and comprising a first polymeric component and a second polymeric component arranged in substantially distinct laterally eccentric zones across the cross-section of the multiple-component filaments and extending substantially continuously along the length of the multiple-component filaments;

a second polymeric layer comprising less than 20 weight percent of laterally eccentric spirally-crimped multiple-component fibers and intermittently bonded to the first layer;

the spirally-crimped multiple-component fibers in the first layer forming spirally-crimped fiber segments positioned substantially in the plane of the first layer and connecting the bonds; and the second layer forming buckled out-of-plane segments between-the bonds.

The invention also includes a process for preparing a stretchable multi-layer composite sheet comprising the steps of:

providing a spirally-crimpable polymeric layer comprising at least 20 weight percent of spirally-crimpable multiple-component fibers, the multiple-component fibers having a cross-section and a length, and comprising a first polymeric component and a second polymeric component arranged in substantially distinct laterally eccentric zones across the cross-section of the multiple-component filaments and extending substantially continuously along the length of the multiple-component filaments;

providing a non-spirally-crimpable polymeric layer comprising less than about 20 weight percent of laterally eccentric spirally-crimpable multiple-component fibers;

intermittently bonding the first polymeric layer to the second polymeric layer with a plurality of bonds to form a bonded multi-layer composite sheet;

heating the bonded multi-layer composite sheet to a temperature sufficient to cause the spirally-crimpable fibers in the first layer to develop three-dimensional spiral crimp, causing the bonded multi-layer composite sheet to shrink by at least 10% in area based on the original sheet area and the second polymeric layer to buckle between the bonds.

BRIEF DESCRIPTION OF THE DRAWINGS

FIG. 1 is a schematic diagram of a process suitable for forming a stretchable bonded bi-layer nonwoven fabric according to the current invention.

FIG. 2 is a schematic diagram of a process suitable for forming a stretchable bonded three-layer nonwoven fabric according to the current invention.

FIG. 5 is a schematic diagram of a side view of a second apparatus suitable for carrying out the crimp-activation step in which a bonded multi-layer composite sheet is floated on a gaseous layer in a transfer zone between two conveying belts.

FIG. 6 is a schematic diagram of a side view of a third apparatus suitable for carrying out the crimp-activation step in which a bonded multi-layer composite sheet is supported during heating on a series of driven rotating rolls.

DETAILED DESCRIPTION OF THE INVENTION

Figure 3:
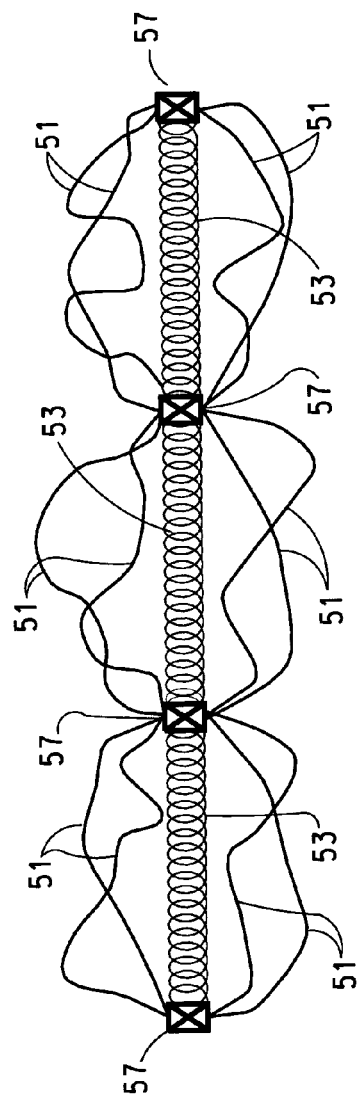
FIG. 3 is a schematic cross-section of a stretchable bonded composite nonwoven fabric made according to the process shown in FIG. 2.

Nonwoven fabrics prepared according to the method of the current invention have an improved combination of elastic stretch, textile hand, drape and strength compared to bonded multiple-component nonwoven fabrics known in the art.

The stretchable multi-layer composite sheets of the current invention are prepared by intermittently bonding a first polymeric layer comprising at least 20 weight percent, preferably at least 50 weight percent and most preferably at least 70 weight percent of laterally eccentric, spirally-crimpable, multiple-component fibers to a second polymeric layer which comprises less than 20 weight percent, more preferably less than 10 weight percent, and most preferably 0 weight percent of spirally-crimpable fibers. The first fibrous polymeric layer can consist essentially of 100 weight percent of spirally-crimpable fibers. The bonding is followed by activating the spiral crimp of the fibers in the first fibrous layer by heating. It is important that the layers are bonded together with a discrete pattern of point bonds, lines, etc. which are separated by sufficient distances to allow the spirally-crimpable fibers to crimp substantially equally and uniformly between the bonds. As the fibers in the first fibrous layer develop spiral crimp during the heating step, the first layer shrinks in the plane of the composite sheet while the second layer does not shrink to any substantial degree. Shrinkage of the first layer causes the second layer to buckle between the bonds, forming a gathered layer attached to the first fibrous layer. In a preferred embodiment, the first and second layers are nonwoven webs including prebonded nonwoven fabrics. Bonded, heat-treated multi-layer nonwoven fabrics prepared according to the current invention are elastic, conformable, strong, and drapeable.

The term "polyester" as used herein is intended to embrace polymers wherein at least 85% of the recurring units are condensation products of dicarboxylic acids and dihydroxy alcohols with linkages created by formation of ester units. This includes aromatic, aliphatic, saturated, and unsaturated di-acids and di-alcohols. The term "polyester" as used herein also includes copolymers (such as block, graft, random and alternating copolymers), blends, and modifications thereof. Examples of polyesters include poly (ethylene terephthalate), which is a condensation product of ethylene glycol and terephthalic acid and poly(trimethylene terephthalate) which is a condensation product of 1,3-propanediol and terephthalic acid.

The terms "nonwoven fabric", "nonwoven web", and "nonwoven layer" as used herein mean a structure of individual fibers, filaments, or threads that are positioned in a random manner to form a planar material without an identifiable pattern, as opposed to a knitted or woven fabric. The term "multi-layer nonwoven fabric" is used herein to refer to a nonwoven fabric that comprises at least two layers wherein each of the layers comprise a nonwoven web. The term "bi-layer nonwoven fabric" is used to refer to a multi-layer fabric that consists of two nonwoven layers.

The term "multi-layer composite sheet" is used herein to refer to a multi-layer construction comprising at least two layers of material wherein at least one of said layers comprises a sheet structure such as a film, fabric, or web. For example, the multi-layer composite sheet can include at least one layer of knit, woven, or nonwoven fabric. Other layers suitable for preparing the multi-layer composite sheets include arrays or warps of filaments, such as an array or warp of spirally-crimpable filaments.

The term "machine direction" (MD) is used herein to refer to the direction in which a nonwoven web is produced. The term "cross direction" (XD) refers to the direction generally perpendicular to the machine direction.

The terms "multiple-component filament" and "multiple-component fiber" as used herein refer to any filament or fiber that is composed of at least two distinct polymers which have been spun together to form a single filament or fiber. As used herein the term "fiber" includes both continuous filaments and discontinuous (staple) fibers. By the term "distinct polymers", it is meant that each of the at least two polymeric components are arranged in distinct substantially constantly positioned zones across the cross-section of the multiple-component fibers and extend substantially continuously along the length of the fibers. The polymeric components in spirally-crimpable fibers useful in forming the spirally-crimpable layer can be chemically different or they can have the same chemical composition. If they are chemically the same, they should differ in isomeric form, crystallinity, shrinkage, elasticity or other property to provide spirally-crimpable fibers. Multiple-component fibers are distinguished from fibers that are extruded from a homogeneous melt blend of polymeric materials in which zones of distinct polymers are not formed. One or more of the polymeric components in the multiple-component fiber can be a blend of different polymers. Multiple-component fibers useful in the current invention have a laterally eccentric cross-section that is the polymeric components are arranged in an eccentric relationship in the cross-section of the fiber. Preferably, the multiple-component fiber is a bicomponent fiber which is made of two distinct polymers and having an eccentric sheath-core or a side-by-side arrangement of the polymers. Most preferably, the multiple-component fiber is a side-by-side bicomponent fiber. If the bicomponent fiber has an eccentric sheath-core configuration, the lower melting polymer is preferably in the sheath to facilitate thermal point bonding of the nonwoven layers prior to heat treatment. The term "single component" fibers as used herein refers to fibers made from a single polymeric component. The single polymeric component can consist essentially of a single polymer or can be a blend of polymers.

The term "multiple-component web" as used herein refers to a nonwoven web comprising multiple-component fibers. The term "bicomponent web" as used herein refers to a nonwoven web comprising bicomponent fibers. The multiple-component and bicomponent webs can comprise blends of multiple-component fibers with single component fibers. Nonwoven layers used to form the multi-layer composite sheets of the current invention can be made from either short (staple) fibers or continuous filaments.

The term "spunbond" fibers as used herein means fibers which are formed by extruding molten thermoplastic polymer material as fibers from a plurality of fine, usually circular, capillaries of a spinneret with the diameter of the extruded filaments then being rapidly reduced by drawing. Other fiber cross-sectional shapes such as oval, multi-lobal, etc. can also be used. Spunbond fibers are generally continuous filaments and have an average diameter of greater than about 5 micrometers. Spunbond nonwoven fabrics or webs are formed by laying spunbond fibers randomly on a collecting surface such as a foraminous screen or belt using methods known in the art. Spunbond webs are generally bonded by methods known in the art such as by thermally point bonding the web at a plurality of discrete thermal bond points, lines, etc. located across the surface of the spunbond fabric.

The term "substantially nonbonded nonwoven web" is used herein to describe nonwoven webs in which there is little or no inter-fiber bonding. In some instances, it can be desirable to pre-consolidate one or more nonwoven layers prior to assembling the layers to form the multi-layer composite sheet. Pre-consolidation improves web cohesiveness and handleability and keeps the fibers in each individual web separated from the fibers of the adjacent webs. Pre-consolidation of the web can be achieved using very light calendering or by passing the fabric through a nip of lightly patterned rolls.

As used herein, the term "elastic" when applied to a nonwoven fabric or multi-layer composite sheet means that when the fabric or composite sheet is stretched by at least 12%, preferably 20%, of its original length and then released, that the nonwoven fabric or composite sheet recovers so that the residual elongation (or permanent set) after release of the stretching force is no greater than 5%, calculated based on the original length of the nonwoven fabric or composite sheet prior to stretching. A method for determining this property is provided in greater detail below.

Laterally eccentric multiple-component fibers comprising two or more synthetic components that differ in their ability to shrink are known in the art. Such fibers can form three-dimensional spiral crimp when the crimp is activated by subjecting the fibers to shrinking conditions in an essentially tensionless state. The amount of crimp is directly related to the difference in shrinkage between the polymeric components in the fibers. When the multiple-component fibers are spun in a side-by-side conformation, the crimped fibers that are formed after crimp activation have the higher-shrinkage component on the inside of the spiral helix and the lower-shrinkage component on the outside of the helix. Such crimp is referred to herein as "spiral crimp". Spirally-crimped fibers are distinguished from mechanically crimped fibers such as stuffer-box crimped fibers which generally have two-dimensional crimp.

A variety of thermoplastic polymers can be used to form the components of multiple-component fibers that are capable of developing three-dimensional spiral crimp. Examples of thermoplastic resin combinations suitable for forming spirally-crimpable, multiple-component fibers are crystalline polypropylene/high density polyethylene, crystalline polypropylene/ethylene-vinyl acetate copolymers, polyethylene terephthalate/high density polyethylene, poly(ethylene terephthalate)/poly(trimethylene terephthalate), poly(ethylene terephthalate)/poly(1,4-butylene terephthalate), and nylon 66/nylon 6.

To achieve high levels of three dimensional spiral crimp, the polymeric components of the multiple-component fibers are preferably selected according to the teaching in Evans, which is hereby incorporated by reference. The Evans patent describes bicomponent fibers in which the polymeric components are partly crystalline polyesters, the first of which has chemical repeat-units in its crystalline region that are in a non-extended stable conformation that does not exceed 90 percent of the length of the conformation of its fully extended chemical repeat units, and the second of which has chemical repeat-units in its crystalline region which are in a conformation more closely approaching the length of the conformation of its fully extended chemical repeat-units than the first polyester. The term "partly crystalline" as used in defining the filaments of Evans serves to eliminate from the scope of the invention the limiting situation of complete crystallinity where the potential for shrinkage would disappear. The amount of crystallinity, defined by the term "partly crystalline" has a minimum level of only the presence of some crystallinity (i.e. that which is first detectable by X-ray diffraction means) and a maximum level of any amount short of complete crystallinity. Examples of suitable fully extended polyesters are poly(ethylene terephthalate), poly (cyclohexyl 1,4-dimethylene terephthalate), copolymers thereof, and copolymers of ethylene terephthalate and the sodium salt of ethylene sulfoisophthalate. Examples of suitable non-extended polyesters are poly(trimethylene terephthalate), poly(tetramethylene terephthalate), poly(trimethylene dinaphthalate), poly(trimethylene bibenzoate), and copolymers of the above with ethylene sodium sulfoisophthalate, and selected polyester ethers. When ethylene sodium sulfoisophthalate copolymers are used, it is preferably the minor component, i.e. present in amounts of less than 5 mole percent and preferably present in amounts of about 2 mole percent. In an especially preferred embodiment, the two polyesters are poly(ethylene terephthalate) and poly(trimethylene terephthalate). The bicomponent filaments of Evans are capable of developing a high degree of helical crimp when heated under tension whereas other polymer combinations must generally be heated in a tensionless state in order for the spiral crimp to develop. The bicomponent filaments of Evans have a high degree of spiral crimp, generally acting as springs, having a recoil action whenever a stretching force is applied and crystalline polymers that are suitable for use in the current invention include syndiotactic polypropylene that crystallizes in an extended conformation and isotactic polypropylene that crystallizes in a non-extended, helical conformation.

In the multi-layer composite sheets of the current invention, the first fibrous layer is referred to herein as a spirally-crimpable layer and the second layer is referred to herein as a non-spirally-crimpable layer, although it is to be understood that the spirally-crimpable layer can also include non-spirally-crimpable fibers and the non-spirally-crimpable layer can include low levels of spirally-crimpable fibers so long as the levels meet the requirements specified above. The non-spirally-crimpable layer should also be a layer that does not shrink to a significant degree during heat treatment compared to the spirally-crimpable layer so that it forms a gathered layer in the final composite sheet. The non-spirally-crimpable layer preferably shrinks by less than about 20 percent in area, more preferably by less than 10 percent in area when heat treated under the conditions used to heat-treat the bonded multi-layer composite. Preferably, the surface area shrinkage of the spirally crimpable layer is at least 20% more than the area shrinkage of the non-spirally-crimpable layer. More preferably, the surface area shrinkage of the spirally-crimpable layer is at least 40% more than the surface area shrinkage of the non-spirally crimpable layer.

One or more of the layers in the multi-layer composite sheet of the current invention can be a nonwoven layer. Nonwoven layers suitable for use in the composite sheets of the current invention can be prepared from staple fibers using methods known in the art such as carding, garnetting or air-laying. The staple fibers preferably have a denier per filament between about 0.5 and 6.0 and a fiber length of between about 0.5 inch (1.27 cm) and 4 inches (10.1 cm). In order to be processed in a carding apparatus, the multiple-component staple fibers preferably have an initial helical crimp level characterized by a Crimp Index (CI) no greater than about 45% and preferably in the range of about 8% to 15%. Methods for determining these crimp values are provided below preceding the Examples. Multiple-component fibers used to prepare nonwoven layers suitable for use as the spirally-crimpable layer preferably have a comparable initial spiral crimp level. Alternately, the multiple-component fibers can be mechanically crimped. However, it has been found that when multiple-component fibers are spun under conditions which provide fibers having zero initial crimp and are then mechanically crimped and formed into a carded web, the resulting nonwoven fabrics generally have lower levels of stretch after heat treatment than those prepared from fibers having an initial spiral crimp level in the range specified above. The polymeric components in the multiple-component fibers are preferably selected such that there is no significant separation of the polymeric components during the web-forming process. Staple webs prepared by carding generally have fibers oriented predominantly in the machine direction, whereas air-laid webs are substantially random or isotropic.

Staple fibers suitable for blending with the spirally-crimpable multiple-component fibers used to form the spirally-crimpable nonwoven layer include natural fibers such as cotton, wool, and silk and synthetic fibers including polyamide, polyester, polyacrylonitrile, polyethylene, polypropylene, polyvinyl alcohol, polyvinyl chloride, polyvinylidene chloride, and polyurethane fiber. Staple fibers useful in forming the non-spirally-crimpable nonwoven layer include polyester, polyamide, polyolefin and cellulosic fibers. When a staple fiber web is used as the non-spirally-crimpable layer, the staple fibers can be blended with lower-melting thermoplastic binder fibers to facilitate bonding of the composite sheet.

One or more of the layers in the multi-layer composite sheets of the current invention can include continuous filaments. For example, continuous filament webs can be prepared using methods known in the art such as spunbonding. For example, a spirally-crimpable layer comprising a continuous filament spunbond nonwoven web can be prepared by feeding the two or more polymer components as molten streams from separate extruders to a spinneret comprising one or more rows of multiple-component extrusion orifices. The spinneret orifices and spin pack design are chosen to provide filaments having the desired cross-section and denier per filament. Continuous filament multiple-component nonwoven webs suitable for use as the spirally-crimpable layer in the current invention preferably comprise at least 40 weight percent, more preferably at least 60 weight percent, of spirally-crimpable multiple-component filaments. The filaments in the spirally-crimpable layer can consist of 100% multiple-component filaments. Preferably, the spunbond filaments have a denier per filament of between about 0.5 and 10.0. The multiple-component continuous filaments preferably have an initial helical crimp level characterized by a Crimp Index (CI) no greater than about 60%. The spirally crimped fibers (whether staple or continuous) are characterized by a Crimp Development (CD) value, wherein the quantity (% CD–% CI) is greater than or equal to 15% and more preferably greater than or equal to 25%. When the spirally-crimpable multiple-component filaments are bicomponent filaments, the ratio of the two polymeric components in each filament is preferably between about 10:90 and 90:10 based on volume (for example measured as a ratio of metering pump speeds), more preferably between about 30:70 and 70:30, and most preferably between about 40:60 and 60:40.

Separate spin packs can be used to provide a mixture of different multiple-component filaments in the web, where different filaments are spun from different spin packs. Alternately, single component fibers can be spun from one or more spin packs to form a spunbond nonwoven web comprising single component and multiple-component filaments.

In a spunbond process, the filaments are extruded from a spinneret as a downwardly moving curtain of filaments and pass through a quench zone where the filaments are cooled, for example by a cross-flow air quench supplied by a blower on one or both sides of the curtain of filaments. The extrusion orifices in alternating rows in the spinneret can be staggered with respect to each other in order to avoid "shadowing" in the quench zone, a situation in which a filament in one row effectively blocks a filament in an adjacent row from the quench air. The length of the quench zone is selected so that the filaments are cooled to a temperature such that the filaments do not stick to each other upon exiting the quench zone. It is not generally required that the filaments be completely solidified at the exit of the quench zone. The quenched filaments generally pass through a fiber draw unit or aspirator that is positioned below the spinneret. Such fiber draw units or aspirators are well known in the art and generally include an elongate vertical passage through which the filaments are drawn by aspirating air entering from the sides of the passage and flowing downwardly through the passage. The aspirating air provides the draw tension which causes the filaments to be drawn near the face of the spinneret plate and also serves to convey the quenched filaments and deposit them on a foraminous forming surface positioned below the fiber draw unit. Alternately, the fibers can be mechanically drawn using driven draw rolls interposed between the quench zone and the aspirating jet. When draw rolls are used to provide the draw tension which causes the filaments to be drawn close to the spinneret face, an aspirating jet can be placed between the draw rolls and the collecting surface to serve as a forwarding jet to deposit the filaments on the web forming surface below. A vacuum can be positioned below the forming surface to remove the aspirating air and draw the filaments against the forming surface.

The spirally-crimpable fibrous layer is preferably a substantially nonbonded nonwoven web of spirally-crimpable multiple-component fibers. In an especially preferred embodiment, the spirally-crimpable fibrous layer is a bicomponent nonwoven web. Any pre-consolidation of the spirally-crimpable nonwoven layer is preferably low enough that the fibers are able to develop sufficient crimp during the heat treatment step to cause the bonded composite sheet to shrink by at least 10% in area based on the original sheet area, preferably at least 20% in area, during the heating step. A pre-consolidated spirally-crimpable nonwoven layer is considered to be substantially nonbonded if the percent area shrinkage of the heat-treated pre-consolidated spirally-crimpable nonwoven layer is at least 90%, preferably 95%, of the area shrinkage of an identical spirally-crimpable nonwoven layer that has not been pre-consolidated and which is subjected to an identical heat treatment step. In a preferred embodiment, the bonded multi-layer composite sheet shrinks in the machine direction and/or the cross direction by at least about 20 percent, more preferably at least 40 percent, during the heat treatment (crimp-activation) step. Examples of suitable multiple-component nonwoven webs include spirally-crimpable multiple-component carded webs, cross-laid (cross-lapped) webs, and continuous filament spunbond webs.

Tensioned, relaxed (i.e., untensioned) or semi-relaxed parallel warps of spirally-crimpable filaments or yarns extended in the machine direction or lapped across the cross direction of the composite sheet can also be used as the spirally-crimpable layer. Such an array of filaments or yarns should be capable of causing the bonded composite sheet to shrink by at least 10% in area based on the original sheet area prior to shrinkage.

The spirally-crimpable layer is selected to obtain the desired stretch properties in the final composite sheet. For example, when stretch properties are desired in the machine direction with minimum stretch in the cross direction, a warp of parallel spirally-crimpable filaments aligned in the machine direction of the composite sheet or a directional (MD oriented) carded web can be used. When two-directional stretch properties are desired, i.e. in both the machine direction and the cross-direction, more random layers of spirally-crimpable continuous filaments or yarns such as air-laid webs and substantially unbonded spunbond webs can be used.

The non-spirally-crimpable layer should be a gatherable layer that is capable of gathering and buckling between the bonds in the multi-layer composite during the heat treatment step as the spirally-crimpable fibrous layer shrinks when the fibers in the spirally-crimpable fibrous layer develop spiral crimp. The non-spirally-crimpable layer preferably does not shrink to any substantial degree during the heat treatment step so that it will gather between the bonds. Examples of materials suitable for use as the non-spirally-crimpable layer include fibrous fabrics, such as nonwoven webs and knit or woven fabrics, and films. In a preferred embodiment, the non-spirally-crimpable layer is a nonwoven web. The non-spirally-crimpable layer preferably has a thickness of between about 0.3 and 1.0 mm before shrinking and buckling. The overall thickness of the composite sheet is preferably less than about 4 mm. The composite sheets also preferably have a bulk less than about 30 $cm^3/g$. Composite sheets in which the non-spirally-crimpable layer is a film are useful in end uses such as raincoats, windjackets, medical devices, etc. Films used in the composite sheets of the current invention can be breathable or non-breathable. Examples of breathable films suitable for use in the current are films of copolyetheresters such as Hytrel®, available from E.I. du Pont de Nemours and Company, Wilmington, Del. (DuPont). Composite sheets in which the non-spirally-crimpable layer is a knit, woven, or nonwoven fabric or web are suitable for use in apparel and home furnishings end uses including upholstery, apparel etc.

Nonwoven webs suitable for use as the non-spirally-crimpable layer include bonded and unbonded webs. Unbonded webs between about 0.2 and 10 mm thick are suitable. Unbonded webs having high bulk will generally require some pre-consolidation to reduce the layer thickness to facilitate thermal pattern bonding to the other layers in the multi-layer composite sheet as well as to allow it to gather during the heat treatment step. The non-spirally-crimpable nonwoven layer can be pre-bonded over part or all of its surface prior to bonding to the spirally-crimpable fibrous layer. In some cases, it can be desirable to pre-bond the non-spirally-crimpable nonwoven layer in order to keep the fibers of that layer separate from the spirally-crimpable fibers in the spirally-crimpable layer thus allowing the non-spirally-crimpable layer to gather independently as the spirally-crimpable layer shrinks, and also to achieve better surface stability. Non-spirally-crimpable nonwoven layers can be pre-bonded using methods known in the art such as hydraulic or mechanical needling, thermal or ultrasonic point bonding, or thermal area bonding.

The individual layers in the multi-layer composite sheets of the current invention can be prepared and combined, bonded, and heat treated in separate process steps. Alternately, the layers can be combined, bonded, and heat treated in-line in a continuous process. When nonwoven layers are used, the individual layers forming the multi-layer nonwoven composite can be consolidated by calendering prior to bonding and heat treatment. Any pre-consolidation of a spirally-crimpable multiple-component nonwoven layer is preferably limited so that the spirally-crimpable nonwoven layer remains substantially nonbonded, except at the bonds where it is attached to the non-spirally-crimpable layer.

The spirally-crimpable and non-spirally-crimpable layers are assembled and bonded together using an intermittent pattern of bonds, for example points or lines, prior to heat treatment. Pattern bonding can be conducted in-line preceding the heating step. Alternately, a bonded composite sheet can be collected, such as by winding on a roll, and then heat-treated in subsequent processing. In a preferred embodiment, the layers are intermittently bonded using thermal or ultrasonic point bonding. Thermal point bonding involves applying heat and pressure at discrete spots on the surfaces of the multi-layer composite, for example by passing the layered structure through a nip formed by a heated patterned calender roll and a smooth roll. During thermal bonding, one or more of the polymeric components in at least one of the layers is partially melted in discrete areas corresponding to raised protuberances on the heated patterned roll to form fusion bonds which hold the individual layers together to form a cohesively bonded multi-layer composite sheet. The bonding roll pattern can be any of those known in the art and preferably is a pattern of discrete point or line bonds.

In an alternate embodiment, the spirally-crimpable fibrous layer can be bonded to a non-spirally-crimpable fibrous layer, such as a non-spirally-crimpable nonwoven layer. A liquid binder, for example latex, can be applied by printing in a pattern on the multi-layer nonwoven fabric. When fibrous web layers are used, the liquid binder is preferably applied to the multi-layer composite in a way that forms bonds that extend through the entire thickness of the web. The liquid binder can be applied through one face after the layers are assembled or applied to the inner surface of either or both of the crimpable or non-crimpable layer(s). Alternately, when-the spirally-crimpable and non-spirally-crimpable layers comprise nonwoven webs, low-melt binder fibers or binder particles can be dispersed into the non-spirally-crimpable layer and/or the spirally-crimpable layer and the multi-layer composite can be bonded using smooth heated calender rollers. Preferably, the binder particles or fibers have dimensions between about 0.2 mm and about 2 mm in at least one direction and are added to the web at levels which provide between about 20 and 200 bonds/in$^2$ (3.1 to 31 bonds/cm$^2$). The low-melt binder particles typically amount to 5–25% of the product weight. When using binder fibers or binder particles, the binder melting temperature, the thickness of the outer layers and the activation temperature of the spirally-crimpable fibers are preferably selected to avoid premature crimp activation during the bonding step. That is, the temperature used during the bonding step is preferably not so high as to cause the fibers in the spirally-crimpable layer to develop any substantial degree of spiral crimp.

Other methods of intermittent bonding that can be used to bond the layers together prior to heat treatment include chemical bonding and mechanical needling. A discrete needling pattern can be achieved using needle plates that can place several needles on the same spot by being synchronized with the web motion. Alternately, an adhesive can be applied intermittently in a pattern on the inner surfaces of the layers before they are contacted with each other.

The bonds are preferably spaced at about 5 to 15 per inch (2 to 6 per centimeter) with approximately 25 to 225 bonds/in$^2$ (3.9 to 35 bonds/cm$^2$). Bond density is kept sufficiently low to maximize the length of the spirally-crimped fiber segments between the bonds while at the same time being high enough to provide a durable cohesive composite sheet. The bond points can be round, square, rectangular, triangular or other geometric shapes and the percent bonded area can vary between about 5 to 50% of the surface of the nonwoven fabric. The distance between adjacent bonds can be adjusted to control the level of stretch in the fabric and optimized to a particular desired stretch level. In general, the distance between the edges of adjacent bond points or lines is preferably in the range of 0.10 to 0.60 cm, more preferably in the range of 0.2 to 0.4 cm.

The bonded multi-layer composite can be heat-treated in-line immediately after bonding or the bonded fabric can be rolled up and heat treated during later processing (dyeing, finishing, etc.). In a preferred embodiment of the current invention, the bonded multi-layer composite is formed from fibrous layers and is heated in a wet-finishing step using hot water or steam, such as during a conventional dyeing or finishing processes.

When the multi-layer composite sheet is very light or very surface sensitive, for example when a substantially non-bonded nonwoven web comprises one of the outer layers, the bonded multi-layer composite sheet is preferably heat-treated under conditions which allow the composite nonwoven to shrink evenly under "free-shrinkage conditions". By "free-shrinkage conditions" it is meant that there is virtually no contact between the web and surfaces that can restrict the shrinkage of the multi-layer composite sheet. That is, there are no substantial mechanical forces acting on the multi-layer composite sheet to interfere with or retard the shrinking process. Alternately, any surface that is in contact with the surface of the multi-layer composite sheet during the heat treatment step is moving at substantially the same surface speed as that of the continuously shrinking multi-layer composite sheet so as to minimize frictional forces which would otherwise interfere with shrinkage of the spirally-crimpable layer. Such free-shrinkage processing will provide maximum shrinkage of the spirally-crimpable layer and maximum final stretch without the need for wet-finishing.

FIG. 1 is a schematic diagram of a continuous process suitable for forming a stretchable, bonded, bi-layer, composite, nonwoven fabric according to the current invention. Spirally-crimpable nonwoven layer 3 is supplied from a web source 1, such as a carding machine, supply roll, etc. and laid onto conveyor belt 5. Non-spirally-crimpable layer 4 is supplied from a second web source 2 and laid on top of spirally-crimpable layer 3. The layered webs are bonded in the nip of pattern bonder 6, such as a thermal point bonder, to form a bonded bi-layer composite fabric 7. Composite fabric 7 is passed through heating station 8 to heat the composite fabric to a temperature that is sufficient to activate the spiral crimp of the fibers in spirally-crimpable layer 3, causing it to shrink and thereby causing non-spirally-crimpable layer 4 to buckle and form gathers between the bond points. The heat-treated, shrunk composite fabric 9 is then wound up as a finished product on wind-up roll 10. Alternately, the web can be wound-up without heating and then later heated and shrunk in a wet-finishing process, as is conventionally done with other "greige" fabrics, such as standard hot-water or steam shrinking, dyeing, framing, and finishing processes.

FIG. 2 is a schematic diagram of a continuous process suitable for forming a stretchable, bonded, multi-layer, composite, nonwoven fabric according to the current invention wherein a spirally-crimpable nonwoven layer is sandwiched between two non-spirally-crimpable nonwoven layers. Non-spirally-crimpable web layers 42 and 48 are supplied from web sources 41 and 47, respectively. Spirally-crimpable multiple-component web 46, supplied from web source 45 is laid down between non-spirally-crimpable layers 42 and 48. Optionally, the non-spirally-crimpable layers can be pre-consolidated by passing each layer through the nip formed by pairs of rolls 43 and 49 to form pre-consolidated non-spirally-crimpable layers 44 and 50. Pre-consolidation flattens the non-spirally-crimpable webs which allows them to more readily buckle between the bond points when the bonded three-layer composite is heat treated. The assembly of three layers 52 is collected on belt 51 and passed through a thermal point bonder 58 to form a three-layer bonded composite 54 which is then passed through heating station 55. The bonded composite is heated to a temperature sufficient to activate the spiral crimp of the fibers in spirally-crimpable layer 46, causing the spirally-crimpable layer to shrink and the non-spirally-crimpable layers to buckle and form gathers between bond points. The heat-treated, shrunk composite fabric 56 is then wound up as a finished product on wind-up roll 59. Alternatively, the bonded unshrunk multi-layer composite nonwoven sheet 54 can also be wound-up without heat treatment and wet-finished such as by using standard dyeing, finishing, etc., processes to activate the spiral crimp in the fibers comprising the spirally-crimpable layer.

FIG. 3 is a schematic cross-section of a stretchable, bonded, composite, nonwoven fabric made according to the process shown in FIG. 2. The spirally-crimped fibers in the spirally-crimped layer form substantially straight spirally-coiled segments 53 in the plane of the spirally-crimped layer between bond points 57. The outer non-spirally-crimpable fibers buckle to form buckled segments 51. When the composite nonwoven fabric is stretched, the spirally-crimped fiber segments 53 in the spirally-crimped layer elongate by pulling out the spiral crimp and the buckled segments 51 of the second layer become substantially taut between bond points 57 when the spirally-crimped fiber segments are substantially completely straightened. Spirally-crimped fiber segments 53 act as springs, stretching when a stretching force is applied to the fabric and having a recoil action whenever the stretching force is released. The composite sheet structures of the invention preferably have a recoverable elastic stretch of at least 12% in at least one direction to form fabrics with a natural draping tendency. More preferably they stretch at least 20% in at least one direction with substantially full recovery (i.e., having a residual elongation, or permanent set of 5% or less).

In order to obtain highly stretchable and strong fabrics, a sufficiently large spacing between the bonds is selected so that the spirally-crimpable fiber segments between adjacent bonds are long enough to provide the desired degree of stretch and the impedance to stretch caused by short connections between bonds is minimized. The non-spirally-crimpable layers reinforce the final product without impeding stretch-recovery since the fibers in the outer layer(s) are buckled "out-of-plane" as shown in FIG. 3. When a biasing force is applied to the composite sheet, the spirally-crimped fibers begin to stretch by extending the spiral crimp, unimpeded by the non-spirally-crimped layer because the gathers are readily stretched to the limit of the original dimension of the composite sheet (prior to shrinkage) at which point they form a straightened layer as the biasing force is increased. When the biasing force is released, the spirally-crimped fibers recover their spiral crimp with a residual sheet elongation preferably no greater than 10% based on the original sheet dimension.

Figure 4:
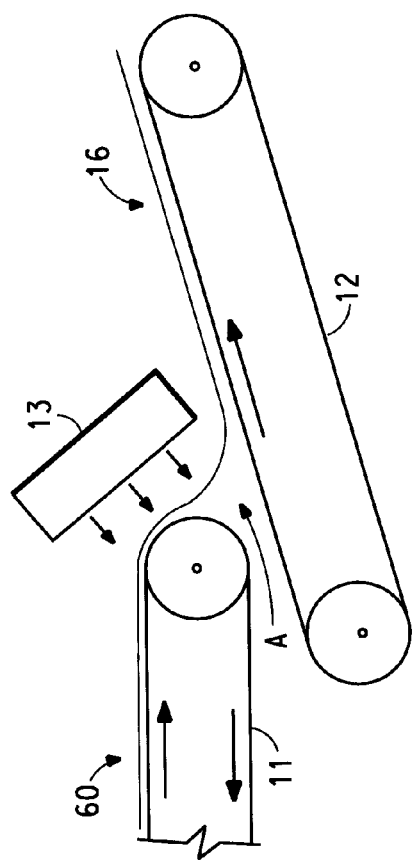
FIG. 4 is a schematic diagram of a side view of an apparatus suitable for carrying out the crimp-activation step in which a bonded multi-layer composite sheet is allowed to free fall from a first conveyor onto a second conveyor.

FIG. 4 shows a schematic side view of an apparatus suitable for carrying out the heat-shrinkage step under "free-shrinkage" conditions in one embodiment of the process of the current invention. Intermittently bonded multi-layer composite sheet 60, comprising a spirally-crimpable layer containing multiple-component fibers bonded to a non-spirally-crimpable layer, is conveyed on a first belt 11 moving at a first surface speed to transfer zone A where the composite sheet is allowed to fall freely until it contacts the surface of a second belt 12 moving at a second surface speed. The second surface speed of the second belt is less than the first surface speed of the first belt. As the composite sheet leaves the surface of belt 11, it is exposed to heat from heater 13 as it free-falls through the transfer zone. Heater 13 can be a blower for providing hot air, an infrared heat source, or other heat sources known in the art such as microwave heating. The composite sheet is heated in transfer zone A to a temperature which is sufficiently high to activate the spiral crimp and cause the composite sheet to shrink, while being substantially free of any external interfering forces. The temperature of the composite sheet in the transfer zone and the distance the composite sheet free-falls in the transfer zone prior to contacting belt 12 are selected such that the desired shrinkage is essentially complete by the time the heat-treated composite sheet contacts belt 12. As the composite sheet initially leaves belt 11, it is travelling at about the surface speed of belt 11. As a result of the shrinkage resulting from activation of the spiral crimp of the multiple-component fibers by the heat applied in the transfer zone, the surface speed of the multi-layer composite sheet decreases as it travels through transfer zone A. The surface speed of belt 12 is selected to match as closely as possible the speed of the multi-layer composite sheet when it leaves transfer zone A and contacts belt 12. After shrinking, the composite sheet can also be over-bonded by heating to a temperature that melts part of the surface(s) of the fibers or low-melting binder fibers blended with the main fibers, by activating the surface of the fibers using chemical means, or by impregnating the composite sheet with a suitable flexible liquid binder.

FIG. 5 shows an apparatus for use in the heat shrinkage step of a second embodiment of the current invention. Intermittently bonded multi-layer composite 20, comprising a spirally-crimpable fibrous layer intermittently bonded to a non-spirally-crimpable layer, is conveyed on a first belt 21 moving at a first surface speed to transfer zone A where it is floated on a gas and then transferred to a second belt 22 moving at a second surface speed. The second surface speed is less than the first surface speed. The gas, such as air, is provided through openings in the upper surface of a supply box 25 to float the bonded multi-layer composite as it is conveyed through the transfer zone. The air provided to float the composite can be at room temperature (approximately 25° C.) or pre-heated to contribute to the shrinkage of the spirally-crimpable layer. Preferably, the air emanates from small densely spaced openings in the upper surface of the air supply box to avoid disturbing the multi-layer composite. The multi-layer composite can also be floated on the air flow generated by small vanes attached to rollers placed under the web. The floating multi-layer composite sheet is heated in transfer zone A by radiant heater 23 (or other suitable heat source) to a temperature that is sufficient to activate the spiral crimp of the multiple-component fibers in the spirally-crimpable layer, causing the spirally-crimpable layer to shrink. The temperature of the multi-layer composite sheet in the transfer zone and the distance the multi-layer composite travels in the transfer zone are selected such that the desired shrinkage is essentially complete prior to contacting second belt 22. The surface speed of the second belt is selected to match as closely as possible to the speed of the heat-treated multi-layer composite sheet as it exits transfer zone A.

FIG. 6 shows an apparatus for use in the heat shrinkage step of a third embodiment of the current invention. Multi-layer composite 30, comprising a spirally-crimpable fibrous layer pattern-bonded to a non-spirally-crimpable layer, is conveyed on a first belt 31 moving at a first surface speed to transfer zone A where it is conveyed on a series of driven rolls 34A through 34F to belt 32 moving at a second surface speed. The second surface speed of belt 32 is less than the first surface speed of belt 31. Although, six rolls are shown in the figure, at least two rolls are required. However, the number of rolls can vary depending on the operating conditions and the particular polymers used in the multiple-component fibers. The multi-layer composite is heated in transfer zone A by radiant heater 33 (or other suitable heat source) to a temperature that is sufficient to activate the spiral crimp of the multiple-component fibers, causing the spirally-crimpable fibrous layer to shrink. The temperature, of the multi-layer fabric in the transfer zone and the distance the fabric travels in the transfer zone are selected such that the desired shrinkage is essentially complete prior to contacting second belt 32. As the spirally-crimpable fibrous layer shrinks, the surface speed of the composite sheet decreases as it is conveyed through the transfer zone. Rolls 34A through 34F are driven at progressively slower peripheral linear speeds in the direction moving from belt 31 to belt 32, with the surface speeds of the individual rolls being selected such that the peripheral linear speed of each roll is within 2–3% of the speed of the multi-layer composite sheet as it contacts the roll. Since the rate at which the spirally-crimpable layer shrinks is generally not known and is dependent upon the web construction, polymers used, process conditions, etc., the speeds of the individual rolls 34A through 34F can be determined by adjusting the speed of each roll during the process to maximize the composite shrinkage and minimize non-uniformities in the final product. The surface speed of the second belt 32 is selected to match as closely as possible the speed of the heat-treated multi-layer composite as it exits transfer zone A and contacts belt 32.

Figure 7:
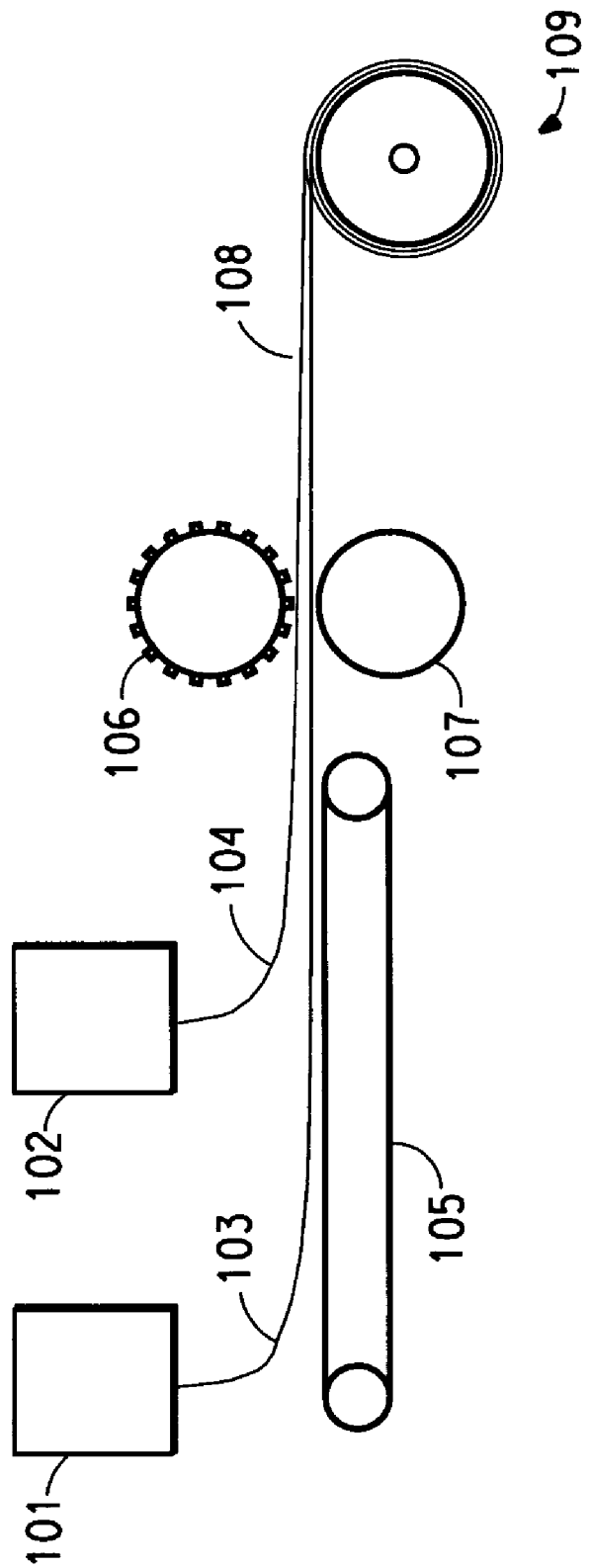
FIG. 7 is a schematic diagram of a side view of a fourth apparatus suitable for carrying out the crimp-activation step of a bonded multi-layer composite sheet.

FIG. 7 is a schematic diagram of a process for forming the bi-layer composite nonwoven fabric according to the current invention, but using a simpler embodiment in the heat shrinkage step. Spirally-crimpable nonwoven layer 103 is supplied from a web source 101, such as a carding machine, supply roll, etc. and laid onto conveyor belt 105. Non-spirally-crimpable layer 104 is supplied from a second web source 102 and laid on top of spirally-crimpable layer 103. The layered webs are passed in the nip of a set of thermal bonding rolls 106 and 107. Roll 106 is shown as a patterned roll and roll 107 is a smooth roll and both rolls are heated to about 200° C. Belt 105 travels at substantially the same surface speed as rolls 106 and 107, but at a speed high enough that activation of the spirally crimpable layer is delayed until very shortly after bonding is completed. As such, separate heating stations 8 and 55 as depicted in FIGS. 1 and 2, respectively are not required. In this embodiment it is preferable that the non-spirally crimpable web as supplied from the sources be substantially unbonded which aids in the shrinkage step as the composite exits the bonding rolls. After exiting rolls 106 and 107, the heat-treated, shrunk composite fabric 108 is then wound up as a finished product on wind-up roll 109. This embodiment is not limited to the two-layer composite depicted in FIG. 7. It would be equally applicable to multi-layer composites as depicted for example in FIG. 2.

The heating time for the crimp-activation step is preferably less than about 10 seconds and is typically less than one second. Heating for longer periods generally requires costly equipment. The web is preferably heated for a time sufficient for the spirally-crimpable fibers to develop at least 90% of their full spiral crimp, causing the multi-layer composite to shrink in area by at least about 10%. The temperature for activating the spiral crimp should be no higher than about 20° C. below the onset of the melting transition temperature of the polymers as determined by Differential Scanning Calorimetry. This is to avoid undesired premature interfiber bonding. The multi-layer composite can be heated to activate the crimp of the fibrous spirally-crimpable layer using a number of heating sources including microwave radiation, hot air, atmospheric steam, and radiant heaters. After the crimp has been activated, the multi-layer composite has preferably shrunk in area by between about 10 and 75% percent, preferably by at least 20 percent, and more preferably at least 40%, compared to the area of the bonded multi-layer composite before heat treatment.

Bonded multiple-component nonwoven fabrics prepared using the process of the current invention are strong, drapeable, elastically stretchable, and have greater strength than multiple-component nonwoven fabrics produced from single-layer nonwoven webs.

Test Methods

Crimp Level Measurement

Crimp properties for the multiple-component fibers used in the examples were determined according to the method disclosed in Evans. This method comprises making 4 length measurements on a wrapped bundle of the multiple-component fiber in filament form (this bundle is referred to as a skein). These 4 length measurements are then used to calculate 4 parameters, which fully describe the crimp behavior of the multiple-component fiber.

The analytical procedure consists of the following steps:
1.) Prepare a skein of 1500 denier from a package of the multiple-component fiber. Since a skein is a circular bundle, the total denier will be 3000 when analyzed as a loop.
2.) The skein is hung at one end, and a 300 gm weight is applied at the other. The skein is exercised by gently moving it up and down 4 times and the initial length of the skein (Lo) is measured.
3.) The 300 gm weight is replaced with a 4.5 gm weight and the skein is immersed in boiling water for 15 minutes.
4.) The 4.5 gm weight is then removed and the skein is allowed to air dry. The skein is again hung and the 4.5 gm weight is replaced. After exercising 4 times, the length of the skein is again measured as the quantity Lc.
5.) The 4.5 gm weight is replaced with the 300 gm weight and again exercised 4 times. The length of the skein is measured as the quantity Le.

From the quantities Lo, Lc, and Le, the following properties are calculated:

CD=Crimp development=100*(Le-Lc)/Le

SS=Skein Shrinkage=100*(Lo-Le)/Lo

CI=Crimp Index and is calculated identical to CD except that step 3 would be omitted in the above procedure.

Bulk Determination

The bulk of a nonwoven web is determined by multiplying the web thickness by the web surface area and dividing the resulting product by the weight of the web. The thickness of the web is measured with a spring-loaded gage using an applied force of 1 g/cm². The surface area of the web is calculated by multiplying the length of the web by the width of the web.

Elastic Stretch Determination

The elastic stretch of the composite sheet was measured in the Examples using a strip 2 inches (5 m) wide by 6 inches (15 cm) long. 10 cm is measured along the 15 cm length, by two marks placed 2.5 cm from each end. The sample is initially stretched by 5% (e.g., a 10 cm length is stretched to 10.5 cm) and released. Thirty seconds is allowed for the sample to recover. This procedure is then repeated on the same sample at 10%, 15%, 20%, etc. to determine the highest level of elastic stretch obtainable for the sample.

Intrinsic Viscosity Determination

The intrinsic viscosity (IV) was determined using viscosity measured with a Viscotek Forced Flow Viscometer Y900 (Viscotek Corporation, Houston, Tex.) for the polyester dissolved in 50/50 weight % trifluoroacetic acid/methylene chloride at a 0.4 grams/dL concentration at 19° C. following an automated method based on ASTM D 5225-92.

EXAMPLES

Preparation of 2GT/3GT Bicomponent Staple Fibers

Side-by-side bicomponent filament yarn was prepared by conventional melt spinning of polyethylene terepthalate (2GT) having an intrinsic viscosity of 0.52 dl/g and polytrimethylene terepthalate (3GT) having an inherent viscosity of 1.00 dl/g through a round 68 hole spinneret with a spin block temperature of 255° C.–265° C. The polymer volume ratio in the fiber was controlled to 40/60 2GT/3GT by adjustment of the polymer throughput during melt spinning. The filaments were withdrawn from the spinneret at 450–550 m/min and quenched via conventional cross-flow air. The quenched filament bundle was then drawn to 4.4 times its spun length to form yarn of continuous filaments having a denier per filament of 2.2, which were annealed at 170° C., and wound up at 2100–2400 m/min. For conversion to staple fiber, several wound packages of the yarn were collected into a tow and fed into a conventional staple tow cutter to obtain staple fiber having a cut length of 1.5 inches (3.8 cm) and a starting spiral crimp of as represented by less than 45% CI.

Example 1

A carded web having a basis weight of 0.6 oz/yd² (20.3 g/m²) was prepared from the poly(ethylene terephthalate)/poly(trimethylene terephthalate) side-by-side bicomponent staple fibers of 40 volume percent poly(ethylene terephthalate) and 60 volume percent poly(trimethylene terephthalate) prepared as described above. Two layers of this web were combined to form the spirally-crimpable layer. The spirally-crimpable layer was sandwiched between two carded webs, one MD and the second XD oriented, each having a basis weight of 0.6 oz/yd² (20.3 g/m²) and composed of 1.5 inch (3.8 cm), 1.5 denier 2GT staple T-54 DuPont polyester. The 3-layer composite nonwoven was bonded with a calender bonder using a flat steel roll heated to 210° C. and a diamond-patterned steel roll heated to 205° C. and a calender speed of 20 yards/minute (18.3 m/min). The diamond pattern produced 225 bonds/in² (35 bonds/cm²), with 20% bonded area, and approximately 0.70 inches (1.78 cm) center-to-center bond distance. The bonded product weighed 3.0 oz/yd² (102 g/m²). It had no stretch in the machine direction and approximately 15% elastic stretch in the cross direction.

A sample of the bonded multi-layer nonwoven composite was heated to a temperature of 100° C. by placing in an oven for 3 minutes. The sample shrank by approximately 10% in the machine direction and approximately 10% in the cross-direction as a result of the heat-treatment step. The heat-treated sample had a basis weight of 3.6 oz/yd² (122 g/m²) and 10% MD and 25% XD elastic stretch. The composite fabric was strong and durable, easily surviving 50 wash cycles.

Comparative Example A

A multi-layer composite nonwoven was prepared as described in Example 1 above, except that each of the outer layers was replaced with a layer of the 0.6 oz/yd² (20.3 g/m²) bicomponent 2GT/3GT carded staple web described in Example 1, so that the multi-layer composite fabric consisted of 4 layers of the bicomponent spirally-crimpable staple fibers each layer alternating MD, XD. The layers were bonded and then heat-treated using the method described in Example 1. The bonded composite shrank by approximately 15% in the machine direction and approximately 25% in the cross direction and had an elastic stretch after heating of 15% MD and 30% XD. The strength of the product was quite low in both the MD and XD and the product had very low tear resistance and abrasion resistance. The product had a rough and abrasive surface that showed considerable "pilling" and surface defects after only a few wash-dry cycles.

Example 2

Filament yarns described in Example 1 were hand-laid in a random manner to form a web weighing approximately 3 oz/yd² (101.7 g/m²). The web was placed between two spunbond Style 2250 Reemay® polyester made by BBA Corp. of Old Hickory, Tenn. Each fully-bonded spunbond layer weighed 0.5 oz/yd² (17.0 g/m²). The composite was processed through a thermal pattern bonder equipped with a patterned roll heated to 220° C. and a flat steel roll heated to 210° C., with a loading of 150 lbs. per linear inch (263 N/cm), at 20 yd/min (18.3 m/min). The pattern of bonds was spaced at 8/inch (3.1/cm) with a spacing of 3.2 mm between bonds and a bonded percentage area of 29%. After bonding the product was virtually unstretchable. The product was heat treated in an air-circulating oven at 150° C. for 1 minute and allowed to relax. It shrank by approximately 10% in both directions. After shrinking the product weighed 4.6 oz/yd² (156 g/m²) and had a machine direction elastic stretch of 15% and a cross-directional elastic stretch of 25%. The outer Reemay® spunbond layers were buckled when the product was relaxed and flat when the product was stretched out in both directions.

Comparative Example B

The bicomponent 2GT/3GT filament web of Example 2 was subjected to the same bonding treatment as in Example 2 without the benefit of the outer layers. The product shrunk from 3 oz/yd² (101 g/m²) to nearly 5.0 oz/yd² (169.5 g/m²) as it exited the bonder. It bonded poorly and had a rough surface. It did not shrink further when subjected to heat treatment at 150° C. It had minimal stretch and essentially no recovery when stretched MD or XD, because the bonds failed with a stretch of less than 10% in either direction.

Example 3

Filament yarns described in Example 1 were hand-laid in a random manner to form a web weighing approximately 2.5 oz/yd² (84.8 g/m²). The web was placed between two spunbond Style 2253C Reemay® polyester made by BBA Corp. of Old Hickory, Tenn. Each lightly consolidated spunbond layer weighed 0.5 oz/yd² (17.0 g/m²). The composite was processed through a thermal bonder equipped with a patterned roll and a smooth steel roll, both heated to 215° C., with a loading of 500 lbs. per linear inch (877 N/cm), at 30 yd/min (27.4 m/min). The patterned roll had square bond points 0.025 inches to a side in a diamond pattern with 333 pts/sq inch with bonded percentage area of 20%. Under these conditions of point bonding, the shrinkage of the composite sheet occurred as the fabric exited the bonding roll as depicted in FIG. 7. The product weighed 4.6 oz/yd² (156 g/m²) and had a machine direction elastic stretch of 21% and a cross-directional elastic stretch of 17%.

What is claimed is:

1. A stretchable multi-layer composite sheet comprising:
 a first polymeric layer comprising at least 20 weight percent of spirally-crimped multiple-component fibers, the multiple-component fibers having a cross-section and a length, and comprising a first polymeric component and a second polymeric component arranged in substantially distinct laterally eccentric zones across the cross-section of the multiple-component filaments and extending substantially continuously along the length of the multiple-component filaments;
 a second polymeric layer comprising less than 20 weight percent of laterally eccentric spirally-crimped multiple-component fibers and intermittently bonded to the first layer;
 the spirally-crimped multiple-component fibers in the first layer forming spirally-crimped fiber segments positioned substantially in the plane of the first layer and connecting the bonds; and
 the second layer forming buckled out-of-plane segments between the bonds;
 wherein the bonds are spaced between about 2 to 6 per centimeter with about 3.9 to 35 bonds/cm² measured when the multi-layer composite sheet is in a substantially tensionless state.

2. The multi-layer composite sheet according to claim 1 wherein the second layer is intermittently bonded to the first layer by a method selected from the group consisting of thermal point bonding, ultrasonic point bonding, mechanical needling, hydraulic needling, chemical bonding, and adhesive bonding.

3. The multi-layer composite sheet according to claim 1 wherein the composite sheet has a thickness less than about 4 mm.

4. The multi-layer composite sheet according to claim 1 wherein the composite sheet has a bulk less than about 30 cc/g.

5. The multi-layer composite sheet according to claim 1, wherein the first polymeric layer comprises at least 50 weight percent of spirally-crimped multiple-component fibers and the second polymeric layer comprises less than 10 weight percent of spirally-crimped multiple-component fibers.

6. The multi-layer composite sheet according to claim 5, wherein the first polymeric layer comprises at least 70 weight percent of spirally-crimped multiple-component fibers and the second layer comprises 0 weight percent of spirally-crimped multiple-component fibers.

7. The multi-layer composite sheet according to claim 6, wherein the first polymeric layer consists essentially of spirally crimped multiple-component fibers.

8. The multi-layer composite sheet according to claim 1, wherein the first polymeric layer is a nonwoven web selected from the group consisting of carded webs, cross-laid webs, air-laid webs and multiple-component spunbond webs.

9. The multi-layer composite sheet according to claim 1, wherein the first polymeric layer comprises a warp of multiple-component filaments.

10. The multi-layer composite sheet according to claim 1, wherein the second polymeric layer is selected from the group consisting of nonwoven webs, films, knit fabrics, and woven fabrics.

11. The multi-layer composite sheet according to claim 1, wherein the first polymeric component is a partly crystalline polyester in which the chemical repeat-units of its crystalline region are in a non-extended stable conformation that does not exceed 90% of the length of the conformation of its fully extended chemical repeat-units and the second polymeric component is a partly crystalline polyester in which the chemical repeat-units of the crystalline region are in a conformation more closely approaching the length of the conformation of its fully extended chemical repeat-units than the first polymer.

12. The multi-layer composite sheet according to claim 11, wherein the non-extended first polymeric component is selected from the group consisting of poly(trimethylene terephthalate), poly(tetramethylene terephthalate), poly(propylene dinaphthalate), poly(propylene bibenzoate), copolymers thereof with ethylene sodium sulfoisophthalate, and polyester ethers and the extended second polymeric component is selected from the group consisting of poly(ethylene terephalate), poly(cyclohexyl 1,4-dimethylene terephthalate), copolymers thereof, and copolymers of ethylene terephthalate and the sodium salt of ethylene sulfoisophthalate.

13. The multi-layer composite sheet according to claim 12, wherein the first and second polymeric components are arranged in a side-by-side configuration.

14. The multi-layer composite sheet according to claim 1, wherein the composite sheet has a recoverable elastic stretch of at least 12% in at least one direction.

15. A process for preparing a stretchable multi-layer composite sheet comprising the steps of:
   providing a spirally-crimpable polymeric layer comprising at least 20 weight percent of spirally-crimpable multiple-component fibers, the multiple-component fibers having a cross-section and a length, and comprising a first polymeric component and a second polymeric component arranged in substantially distinct laterally eccentric zones across the cross-section of the multiple-component filaments and extending substantially continuously along the length of the multiple-component filaments;
   providing a non-spirally-crimpable polymeric layer comprising less than about 20 weight percent of laterally eccentric spirally-crimpable multiple-component fibers;
   intermittently bonding the first polymeric layer to the second polymeric layer with a plurality of bonds to form a bonded multi-layer composite sheet;
   heating the bonded multi-layer composite sheet to a temperature sufficient to cause the spirally-crimpable fibers in the first layer to develop three-dimensional spiral crimp, causing the bonded multi-layer composite sheet to shrink by at least 10% in area based on the original sheet area and the second polymeric layer to buckle between the bonds.

16. The process according to claim 15, wherein the bonded multi-layer composite sheet shrinks by at least 20% in area based on the original sheet area during the heating step.

17. The process according to claim 16, wherein the spirally-crimpable layer comprises at least 50 weight percent of spirally-crimpable multiple-component fibers and the non-spirally-crimpable layer comprises less than 10 weight percent of spirally-crimpable multiple-component fibers.

18. The process according to claim 17, wherein the spirally-crimpable layer comprises at least 70 weight percent of spirally-crimpable multiple-component fibers and the non-spirally-crimpable layer comprises substantially 0 weight percent of spirally-crimpable multiple-component fibers.

19. The process according to claim 15, wherein the spirally-crimpable layer is selected from the group consisting of warps of multiple-component filaments and multiple-component nonwoven webs.

20. The process according to claim 15, wherein the non-spirally-crimpable layer is selected from the group consisting of films, nonwoven webs, knit fabrics, and woven fabrics.

21. The process according to claim 19, wherein the spirally-crimpable layer is a nonwoven web selected from the group consisting of multiple-component carded webs, multiple-component cross-laid webs, multiple-component air-laid webs, and multiple-component spunbond webs.

22. The process according to claim 20, wherein the non-spirally-crimpable layer is a nonwoven web selected from the group consisting of carded webs, multiple-component cross-laid webs, air-laid webs, and spunbond webs.

23. The process according to claim 15, further comprising the step of pre-consolidating the non-spirally-crimpable layer prior to bonding to the spirally-crimpable layer.

24. The process according to claim 23, wherein the non-spirally-crimpable layer is pre-consolidated by mechanically flattening the layer.

25. The process according to claim 24, wherein the non-spirally-crimpable layer is flattened by passing the layer between a nip formed by two rotating rolls.

26. The process according to claim 15, wherein the intermittent bonds are formed using a bonding method selected from the group consisting of thermal point bonding, ultrasonic point bonding, mechanical needling, hydraulic needling, chemical bonding, and adhesive bonding.

27. The process according to claim 26, wherein the bonds are spaced between about 2 to 6 per centimeter with approximately 3.9 to 35 bonds/cm$^2$.

28. The process according to claim 15, wherein the heating step is performed under free-shrinkage conditions.

29. The process according to claim 15, wherein the heating step comprises a wet finishing process.

30. The process according to claim 29, wherein the wet finishing process is a dyeing process.

31. The process according to claim 15, wherein the first polymeric component is a partly crystalline polyester in which the chemical repeat-units of its crystalline region are in a non-extended stable conformation that does not exceed 90% of the length of the conformation of its fully extended chemical repeat-units and the second polymeric component is a partly crystalline polyester in which the chemical repeat-units of the crystalline region are in a conformation more closely approaching the length of the conformation of its fully extended chemical repeat-units than the first polymer.

32. The process according to claim 31, wherein the non-extended first polymeric component is selected from the group consisting of poly(trimethylene terephthalate), poly(tetramethylene terephthalate), poly(propylene dinaphthalate), poly(propylene bibenzoate), copolymers thereof with ethylene sodium sulfoisophthalate, and polyester ethers and the extended second polymeric component is selected from the group consisting of poly(ethylene terephthalate), poly(cyclohexyl 1,4-dimethylene terephthalate), copolymers thereof, and copolymers of ethylene terephthalate and the sodium salt of ethylene sulfoisophthalate.

33. The process according to claim 32, wherein the first and second polymeric components of the multi-layer composite sheet are arranged in a side-by-side configuration.

34. The process according to claim 15, wherein the intermittently bonding step and the heating step are performed substantially at the same time.

35. An article of fabric comprising a stretchable multi-layer composite sheet further comprising:
   a first polymeric layer comprising at least 20 weight percent of spirally-crimped multiple-component fibers, the multiple-component fibers having a cross-section and a length, and comprising a first polymeric component and a second polymeric component arranged in substantially distinct laterally eccentric zones across the cross-section of the multiple-component filaments and extending substantially continuously along the length of the multiple-component filaments;
   a second polymeric layer comprising less than 20 weight percent of laterally eccentric spirally-crimped multiple-component fibers and intermittently bonded to the first layer;
   the spirally-crimped multiple-component fibers in the first layer forming spirally-crimped fiber segments positioned substantially in the plane of the first layer and connecting the bonds; and
   the second layer forming buckled out-of-plane segments between the bonds.

* * * * *